(12) United States Patent
McIntosh

(10) Patent No.: US 6,607,229 B1
(45) Date of Patent: Aug. 19, 2003

(54) TRUCK BOX COVER/EXTENSION ASSEMBLY

(76) Inventor: John A. McIntosh, 19 Turner Cresent, St. Catharines, Ontario (CA), L2P-2H7

( * ) Notice: Subject to any disclaimer, the term of this patent is extended or adjusted under 35 U.S.C. 154(b) by 0 days.

(21) Appl. No.: 10/039,560

(22) Filed: Jan. 8, 2002

(51) Int. Cl.[7] ................................................ B62D 33/00
(52) U.S. Cl. ...................... 296/26.06; 296/32; 296/36; 296/40; 296/100.07
(58) Field of Search ............................... 296/26.06, 32, 296/36, 100.06, 100.07, 40

(56) References Cited

U.S. PATENT DOCUMENTS

| | | | |
|---|---|---|---|
| 2,371,497 A | * | 3/1945 | Black .......................... 296/40 |
| 4,531,775 A | * | 7/1985 | Beals ..................... 296/100.06 |
| 5,009,457 A | * | 4/1991 | Hall .................. 296/100.07 X |
| 5,110,021 A | * | 5/1992 | Dawson, Jr. ......... 296/26.06 X |
| 6,254,169 B1 | * | 7/2001 | Arthur ............... 296/100.06 X |

* cited by examiner

*Primary Examiner*—Dennis H. Pedder

(57) ABSTRACT

A truck box cover/extension assembly for protecting the contents in the truck box and extending the vertical size of the truck box when needed to carry larger items. The truck box cover/extension assembly includes panel members being adapted to be hingedly attached to side walls of a truck box and to be closable and sealable upon the truck box; and also includes panel support members being removably attached to the panel members to support the panel members in upright vertical positions; and further includes stopper members for supporting the panel members in upright vertical positions.

2 Claims, 3 Drawing Sheets

TRUCK BOX COVER/EXTENSION ASSEMBLY

BACKGROUND OF THE INVENTION

1. Field of the Invention

The present invention relates to truck box covers and extensions and more particularly pertains to a new truck box cover/extension assembly for protecting the contents in the truck box and extending the vertical size of the truck box when needed to carry larger items.

2. Description of the Prior Art

The use of truck box covers and extensions is known in the prior art. More specifically, truck box covers and extensions heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,106,051; U.S. Pat. No. 3,420,570; U.S. Pat. No. 5,011,214; U.S. Pat. No. 5,427,428; U.S. Pat. No. 4,946,217; and U.S. Pat. No. Des. 327,668.

While these devices fulfill their respective, particular objectives and requirements, the aforementioned patents do not disclose a new truck box cover/extension assembly. The inventive device includes panel members being adapted to be hingedly attached to side walls of a truck box and to be closable and sealable upon the truck box; and also includes panel support members being removably attached to the panel members to support the panel members in upright vertical positions; and further includes stopper members for supporting the panel members in upright vertical positions; and allows a user to not only sealably cover the truck box but also vertical extend the truck box for added storage when needs, a dual feature not described nor suggested by any of the prior art.

In these respects, the truck box cover/extension assembly according to the present invention substantially departs from the conventional concepts and designs of the prior art, and in so doing provides an apparatus primarily developed for the purpose of protecting the contents in the truck box and extending the vertical size of the truck box when needed to carry larger items.

SUMMARY OF THE INVENTION

In view of the foregoing disadvantages inherent in the known types of truck box covers and extensions now present in the prior art, the present invention provides a new truck box cover/extension assembly construction wherein the same can be utilized for protecting the contents in the truck box and extending the vertical size of the truck box when needed to carry larger items.

The general purpose of the present invention, which will be described subsequently in greater detail, is to provide a new truck box cover/extension assembly which has many of the advantages of the truck box covers and extensions mentioned heretofore and many novel features that result in a new truck box cover/extension assembly which is not anticipated, rendered obvious, suggested, or even implied by any of the prior art truck box covers and extensions, either alone or in any combination thereof.

There has thus been outlined, rather broadly, the more important features of the truck box cover/extension assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new truck box cover/extension assembly which has many of the advantages of the truck box covers and extensions mentioned heretofore and many novel features that result in a new truck box cover/extension assembly which is not anticipated, rendered obvious, suggested, or even implied by any of the prior art truck box covers and extensions, either alone or in any combination thereof.

Still another object of the present invention is to provide a new truck box cover/extension assembly for protecting the contents in the truck box and extending the vertical size of the truck box when needed to carry larger items.

Still yet another object of the present invention is to provide a new truck box cover/extension assembly that allows the user to conveniently and safely carry items in the truck box without having to necessarily tie the items down.

Even still another object of the present invention is to provide a new truck box cover/extension assembly that safeguards the items being carried in the truck box and also improves fuel efficiency because of aerodynamics.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
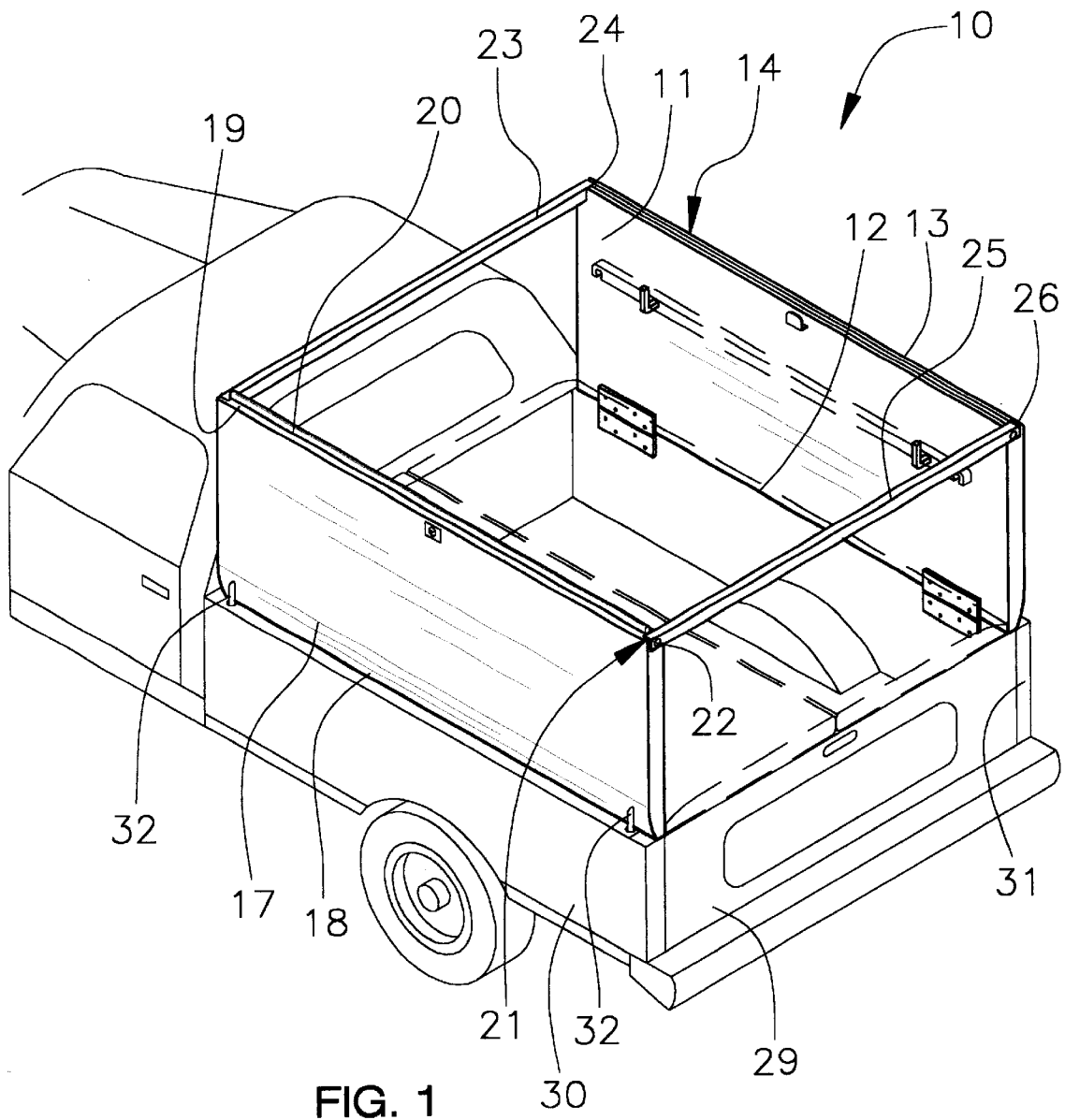
FIG. 1 is a perspective view of a new truck box cover/extension assembly according to the present invention.
Figure 2:
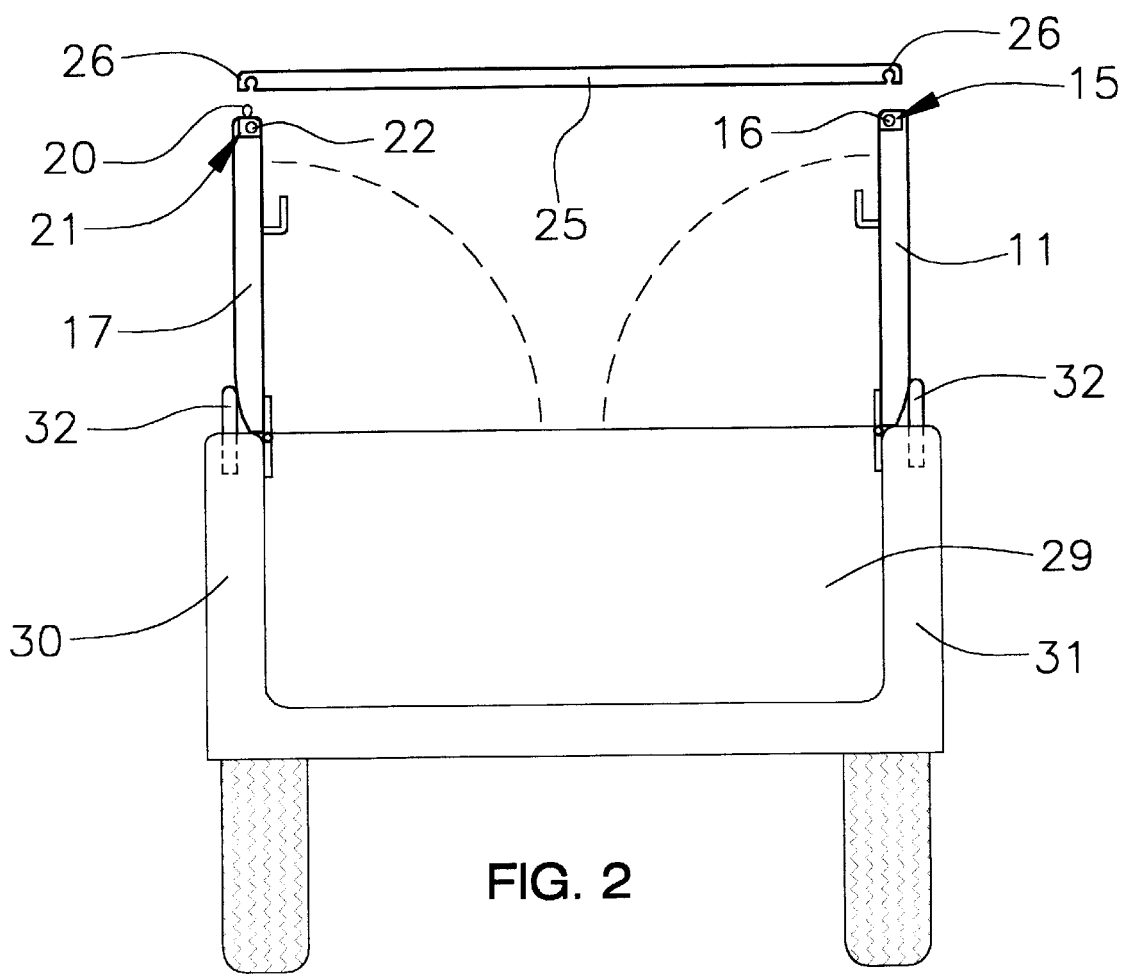
FIG. 2 is a rear elevational view of the present invention.
Figure 3:
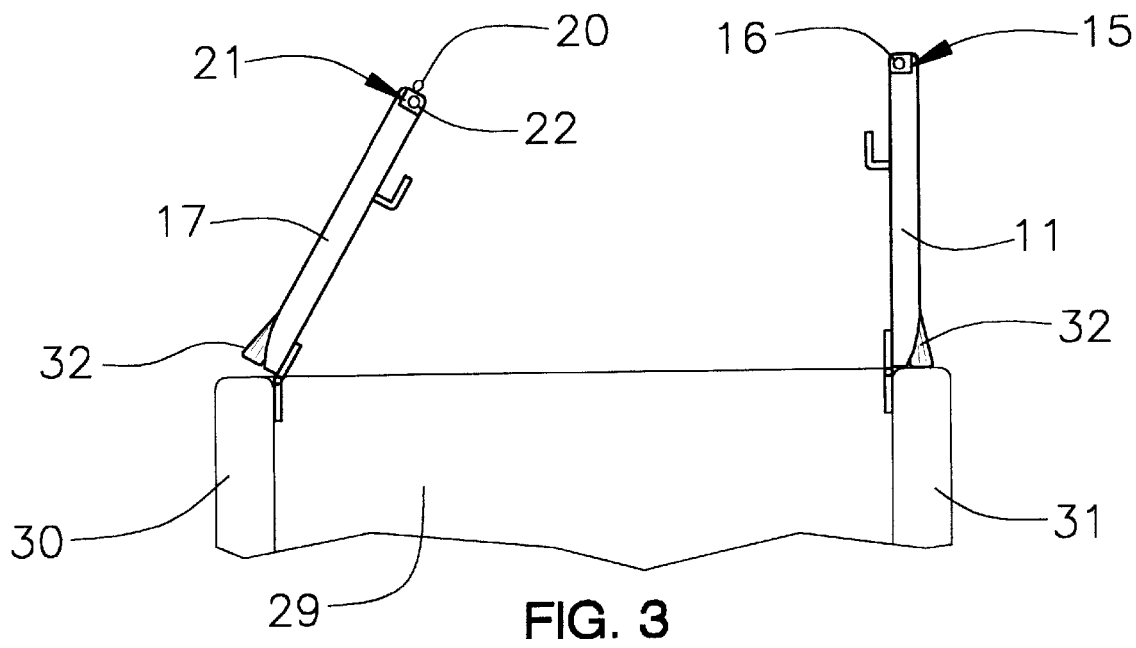
FIG. 3 is another rear elevational view of the present invention being closed over a truck box.
Figure 4:
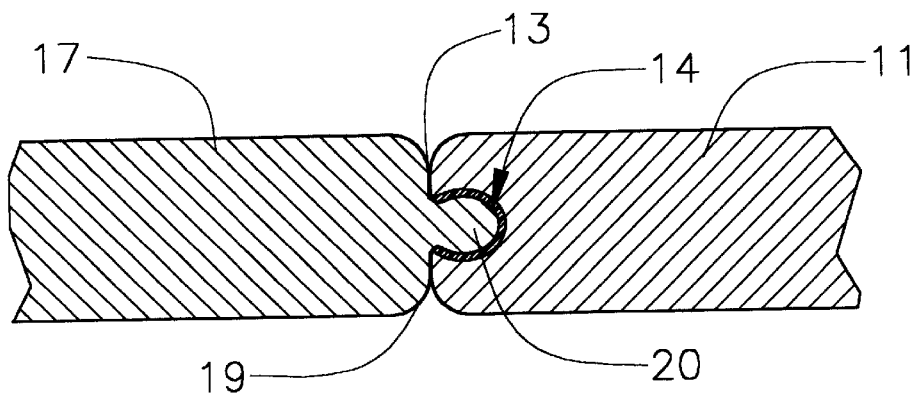
FIG. 4 is a partial cross-sectional view of the first and second panel members of the present invention.
Figure 5:
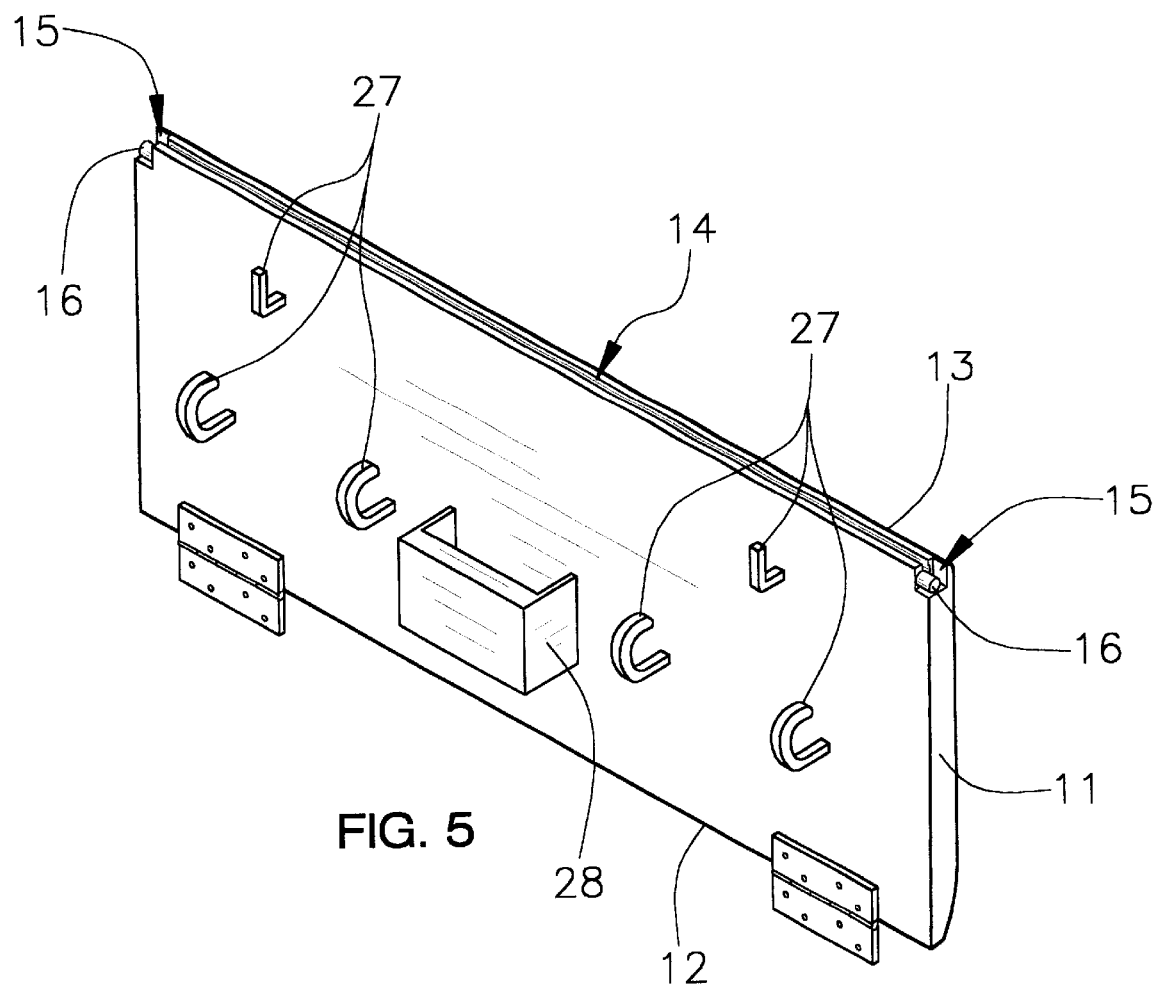
FIG. 5 is a perspective view of the underside of the first panel member of the present invention.

With reference now to the drawings, and in particular to FIGS. 1 through 5 thereof, a new truck box cover/extension assembly embodying the principles and concepts of the present invention and generally designated by the reference numeral 10 will be described.

As best illustrated in FIGS. 1 through 5, the truck box cover/extension assembly 10 generally comprises panel members 11,17 being adapted to be hingedly attached to side walls 30,31 of a truck box 29 and to be closable and sealable upon the truck box 29. The panel members 11,17 include first and second panel members 11,17 each having a first longitudinal edge 12,18 which is adapted to be hingedly and conventionally attached to a respective side wall 30,31 of the truck box 29 and each also having a second longitudinal edge 13,19. The second longitudinal edge 13 of the first panel member 11 has a longitudinal groove 14 being disposed therein, and the second longitudinal edge 19 of the second panel member 17 has a longitudinal rib 20 being conventionally disposed and attached thereupon and being sealably received in the longitudinal groove 14 upon the first and second panel members 11,17 being closed upon the truck box 29. The second longitudinal edges 13,19 of the first and second panel members 11,17 have recessed end portions 15,21 and also have peg-like members 16,22 being securely and conventionally disposed in the recessed end portions 15,21.

Panel support members 23,25 are removably attached to the panel members 11,17 to support the panel members 11,17 in upright vertical positions. The panel support members 23,25 are generally elongate brace members each having hook ends 24,26 which are removably disposed about the peg-like members 16,22 to interconnect the first and second panel members 11,17 and to brace the first and second panel members 11,17 in upright vertical positions. Stopper members 32 are used for conventionally supporting the panel members 11,17 in upright vertical positions. The truck box cover/extension assembly 10 further includes bracket members 27 and storage members 28 being conventionally attached to undersides of the first and second panel members 11,17 for holding and storing selected accessories thereto.

In use, to cover the truck box 29, the user removes the panel support members 23,25 from the first and second panel members 11,17 and lowers the first and second members 11,17 downwardly over the truck box 29 with the longitudinal rib 20 being sealably received in the longitudinal groove 14. To extend the height of the truck box 29, the user raises the first and second panel members 11,17 in upright vertical positions upon the side walls 30,31 of the truck box 29 and engages the hook ends 24,26 of the elongate brace members 23,25 about the peg-like members 16,22 to stabilize and secure the first and second panel members 11,17 in the upright vertical positions.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the truck box cover/extension assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A truck box cover/extension assembly comprising:

panel members being adapted to be hingedly attached to side walls of a truck box and to be closable and sealable upon the truck box, said panel members including first and second panel members each having a first longitudinal edge which is adapted to be hingedly attached to a respective side wall of the truck box, and each also having a second longitudinal edge, said second longitudinal edge of said first panel member having a longitudinal groove disposed therein, and said second longitudinal edge of said second panel member having a longitudinal rib disposed thereupon and being sealably received in said longitudinal groove upon said first and second panel members being closed upon the truck box, said second longitudinal edges of said first and second panel members having recessed end portions and also having peg-like members being securely disposed in said recessed end portions;

panel support members being removably attached to said panel members to support said panel members in upright vertical positions; and stopper members for supporting said panel members in upright vertical positions.

2. A truck box cover/extension assembly as described in claims 1, wherein said panel support members are generally elongate brace members each having hook ends which are removably disposed about said peg-like members to interconnect said first and second panel members and to brace said first and second panel members in upright vertical positions.

* * * * *